June 19, 1956 H. S. WOODWARD, II 2,751,542
AIRCRAFT ACCELERATION LIMITERS
Filed Oct. 24, 1951
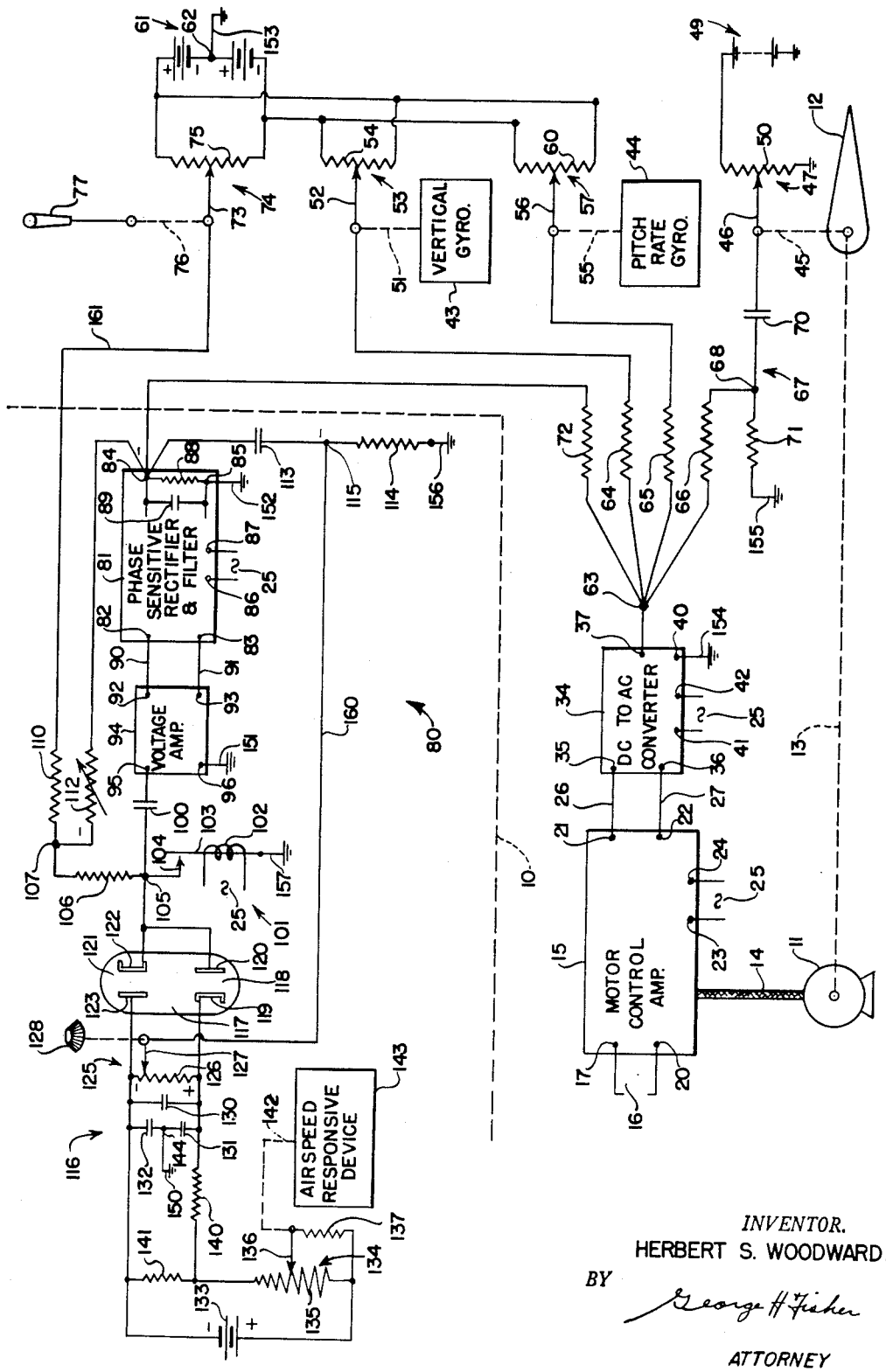
INVENTOR.
HERBERT S. WOODWARD II
BY
George H Fisher
ATTORNEY

United States Patent Office 2,751,542
Patented June 19, 1956

2,751,542

AIRCRAFT ACCELERATION LIMITERS

Herbert S. Woodward II, Golden Valley, Minn., assignor to Minneapolis-Honeywell Regulator Company, Minneapolis, Minn., a corporation of Delaware Application October 24, 1951, Serial No. 252,914

21 Claims. (Cl. 318—489)

This invention relates to the field of aircraft control apparatus, and more particularly to means for preventing operation of the controls of an aircraft in such a fashion as to endanger its structural safety or the welfare of the human pilot.

In aircraft design the structural characteristics of the various components are selected with normal flight in mind. While, of course, the safety factors are also applied, a very real penalty is paid in operating efficiency for each increment of unnecessary weight added to the craft, and it is not found practical to design a craft for structural safety in all conceivable maneuvers. Instead, the human pilot is relied on to so control the flight of the craft that abnormal forces will not be applied to it. The result is that inattention, inexperience, or even mere fatigue on the part of a human pilot can lead to errors in judgment which may cost the life of the pilot, or cause destruction of the aircraft.

The development of automatic pilots for aircraft has not entirely eliminated this danger, since the function of an automatic pilot is ordinarily to maintain an aircraft in a condition of flight once it has been established by the human pilot: after a stabilized condition of the automatic pilot has been established, any departures from such condition are corrected for as they occur, and the necessity for applying large corrections, with the accompanying large acceleration forces on the aircraft, does not, of course, exist. It is further to be noted that modern automatic pilots are being provided with control sticks by means of which the human pilot can change at will the condition of flight which the automatic pilot is stabilizing. The manual exertion required from the human pilot in operating such a control member in an automatic pilot is negligible, as compared to his exertion in actually controlling the aircraft manually, and it is very easy for him to be misled into applying the relatively great power of the automatic pilot to the aircraft in such a fashion as to endanger his safety.

The greatest danger to the aircraft is found in pulling out of climbs and dives, since the accelerations due to centrifugal force resulting from turns about the craft's pitch axis at a high speed are very considerable. The physical effects on the human pilot of these accelerations are also well known, and have been given the popular names of "red-out" and "black-out," depending on whether the acceleration drives the blood to the pilot's head or drives the blood toward his feet. As it happens, both the aircraft and the human pilot are more susceptible to damage when the nose of the craft is being lowered than when the nose of the craft is being raised. This is because of the fact that as far as the craft is concerned, the wings and their attachments to the fuselage are designed for forces acting vertically upward on the lower surfaces of the wing, since this is the direction in which force is normally applied to the wing. In a parallel fashion, aeronautical medicine has learned that more serious and more permanent injury comes to the human pilot from the additional blood pressure in the brain caused by accelerations accompanying the lowering of the craft's nose than by temporary lack of blood in the brain caused by accelerations accompanying raising the nose of the craft.

It is known that the magnitude of a vertical acceleration is determined both by the rate of raising or lowering the nose of the aircraft and by the airspeed. Further, the rate of movement of the nose is controlled by the craft's elevator position and the airspeed. Since the effectiveness of a given elevator position in controlling the nose movement varies substantially as the square of the airspeed, both factors must be considered if the acceleration is to be controlled effectively.

All the factors listed above emphasize and explain the need for some sort of arrangement to prevent inadvertent miscontrol of the aircraft by the human pilot from resulting in such vertical accelerations as are dangerous to the structure of the craft, and the health of the pilot.

Means are known for performing this function by preventing the control signal through the elevator channel of a craft's automatic pilot from varying at more than a selected rate, while not changing the value finally reached. Such an arrangement is shown in the copending application of Ross C. Alderson, Serial No. 247,449, filed September 20, 1951, and assigned to the assignees of the present invention, and the present invention is an improvement thereon.

In the prior application an elevator control signal from a device such as the control stick is opposed by the feedback signal from an amplifier whose input signal is the sum of the control signal, the feedback signal, and a rate feedback signal. Diode limiting means prevent the sum of these signals from exceeding a selected value, and hence limit the rate at which the output of the amplifier is varied. The diode means includes biasing apparatus adjustable in accordance with airspeed, and in accordance with the different tolerances of craft and pilot to vertical accelerations in opposite senses.

In using the prior arrangement it has been found that a very considerable portion of the diode biasing voltage is required to overcome the voltages resulting from Edison effect currents in the diodes. This of itself is not significant, but the Edison effect currents vary widely with filament current in the diodes, which is normally regulated only very roughly in aircraft. The biasing voltage on the other hand is reasonably constant, so that variations in the Edison effect currents act to vary the points at which the diodes begin to limit, and hence the permissible rate of variation of the amplifier output. The voltage changes resulting from variations in the Edison effect currents are found as a matter of fact, to be of comparable magnitude to the input signal itself, unless the gain of the amplifier is greatly reduced to accommodate large input signals without saturating, and this reduction in gain also results in reduced accuracy of the arrangement as an integrator.

It has also been found, in using the prior arrangement, that an unnecessary degree of limiting of the elevator signal inherently occurs. This is because craft and pilot can stand, for brief intervals, accelerations which could not be tolerated over any extended period. Interpreted in terms of craft control, this means that for small desired changes of pitch attitude, which can be accomplished quickly, there actually need be no rate limitation at all.

The present invention has for its purpose to overcome the disadvantages of the prior arrangement just mentioned. It is an object of the invention to provide an acceleration limiter in which the effect of variations in Edison effect currents is minimized.

It is a more specific object of the invention to provide such an acceleration limiter in which a control voltage is so proportioned as to make negligible any variation, due to Edison effect currents in the apparatus, in a bias voltage normally opposing the signal voltage.

It is another object of the invention to provide means, in an acceleration limiter as described above, for preventing performance of the limiting function for small input signals.

Another object of the invention is to provide an arrangement normally reducing a control signal as described above in accordance with its rate of change, but with the further characteristic that the arrangement becomes inoperative for rates of change of the control signal of less than the selected magnitude, which may be varied.

A more specific object of the invention is to provide electronic apparatus which supplies a unidirectional output voltage determined by the magnitude and rate of change of a unidirectional input voltage, and which includes a limiter circuit having a first, adjustable bias and a second bias which varies with the rate of change of the output voltage.

A further specific object of the invention is to provide an improved circuit in which a rate feedback is used to modify an input voltage, not by being added thereto, but by modifying the point at which a limiter on the input voltage is permitted to come into operation.

Yet another specific object of the invention is to provide means as just described, in which there is a bias voltage provided for the limiter, so that for values of the rate feedback voltage less than the bias voltage no modification of the limiter operation results.

A further object of the invention is to provide an improved limiting circuit in which variations in Edison effect currents in limiting diodes is made negligible while at the same time the limiting function is prevented from occurring for small input signals applied thereto.

Various other objects, advantages, and features of novelty which characterize my invention are pointed with particularity in the claims connected hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

The single figure of the drawing shows an automatic pilot including means according to the invention for preventing operation of the automatic pilot, in response to a control signal, in such a fashion as to produce unsafe accelerations of the craft.

The normal automatic pilot is shown below and to the right of the broken line 10 in the figure to comprise a servomotor 11 actuating the elevators 12 of the craft through a suitable mechanical connection 13. Motor 11 is energized, through an electrical cable 14 and a motor control amplifier 15, from a source 16 of direct current connected to terminals 17 and 20 of amplifier 15, which is also provided with input terminals 21 and 22 and with further terminals 23 and 24 energized from a suitable source 25 of alternating voltage of a selected frequency. Amplifier 15 functions to cause operation of motor 11, in a forward or reverse direction in accordance with the phase of the voltage on terminals 21 and 22 compared with that on terminals 23 and 24, and at an effective speed determined by the amplitude of the former voltage, up to a predetermined maximum effective speed. One example of a suitable amplifier is to be found in Gille Patent 2,425,734, where it is used to control a pair of clutches.

The signal for amplifier 15 is supplied through conductors 26 and 27 from a D. C.-to-A. C. converter 34 having output terminals 35 and 36, input terminals 37 and 40, and power terminals 41 and 42 which are energized with alternating voltage from source 25. Converter 34 operates to supply at output terminals 35 and 36 an alternating voltage, of the frequency of source 25, which is in phase with the source or 180° out of phase with the source according as a unidirectional voltage applied to input terminals 37 and 40 is of one polarity or the other.

The input to converter 34 is normally determined by the movement of elevators 12, and by the responses of a vertical gyroscope 43 and a pitch-rate gyroscope 44 to movements of the aircraft. To this end mechanical connection 13 is extended as at 45 to actuate the slider 46 of a voltage divider 47 having a winding 50 energized from a source 49 of regulated unidirectional voltage. Vertical gyroscope 43 acts through a mechanical connection 51 to actuate the slider 52 of a voltage divider 53 having a winding 54. Pitch rate gyroscope 44 acts through a mechanical connection 55 to actuate the slider 56 of a voltage divider 57 having a winding 60.

Windings 54 and 60 are energized from a source 61 of unidirectional voltage having a central tap 62. Sliders 52 and 56 are connected to a summation terminal 63 through summing resistors 64 and 65. Slider 47 is connected to summation terminal 63 through summing resistor 66, and a rate network 67 comprising a capacitor 70 and a resistor 71. Also connected to summation terminal 63 is a further summing resistor 72, which according to prior art would be connected to the slider 73 of a voltage divider 74 having a winding 75 energized from source 61. Slider 73 is designed for adjustment, through a suitable mechanical connection 76, by a control stick 77.

According to the present invention, however, there is interposed between summing resistor 72 and slider 73 an acceleration limiter 80. As is shown above and to the left of broken line 10 in the drawing, limiter 80 comprises a phase sensitive rectifying unit 81 having input terminals 82 and 83, output terminals 84 and 85, and power terminals 86 and 87 energized with alternating voltage from source 25. The output circuit of unit 81 is shown to include a large filter capacitor 89, connected in parallel with the effective output resistance of the unit, which is indicated by resistor 88. The function of this component of the limiter is to provide, at output terminals 84 and 85, a unidirectional voltage which varies in magnitude and reverses in polarity with variations in the amplitude and reversal in the phase of an alternating voltage applied to input terminals 82 and 83, the standard phase being that supplied by source 25.

Input terminals 82 and 83 are energized, through conductors 90 and 91, from the output terminals 92 and 93 of a voltage amplifier 94 having input terminals 95 and 96. Amplifier 94 is of conventional structure, and operates to supply at output terminals 92 and 93 an alternating voltage of the same frequency and phase as the voltage supplied at terminals 95 and 96, but of increased amplitude.

The input voltage to amplifier 94 is made up of a signal component and a feedback component. The signal component may be supplied by operation of control stick 77, or it may come from some other control device such as an altitude controller. The feedback component includes a first portion which varies in accordance with the output of unit 81, and may include a second portion which varies in accordance with the rate of change of the output. The structure for supplying these voltage components will now be described.

The inputs for amplifier 94 are supplied to a summation terminal 105, that is connected through an isolating resistor 106 to a second summation terminal 107. Slider 73 is connected to terminal 107 through a summing resistor 110. Summation terminal 105 is coupled to amplifier 94 by a capacitor 100, and is connected to the fixed contact 104 of a vibrator 101 having a movable contact 103 actuated when a winding 102 is energized with alternating voltage of the frequency of source 25. A further summing resistor 112 is shown as connected between summation terminal 107 and terminal 84, to give de-generative feedback. Resistor 112 is shown as variable, and is to be adjusted until the steady state voltage at terminal 84 is the same as that at slider 73, that is, until the gain of the system is one.

Connected between terminal 84 and ground is a series circuit comprising a capacitor 113 and a resistor 114 having a common terminal 115. Terminal 115 is connected to terminal 105 through a gating network generally indicated at 116.

Network 116 is shown to comprise an electron discharge device 117, including a first diode 118 having a cathode 119 and an anode 120 and a second diode 121 having a cathode 122 and an anode 123, a voltage divider 125 having a winding 126 and a slider 127 actuated by a manual knob 128, a filter network comprising capacitors 130, 131, and 132, and a power supply including a source 133 of unidirectional voltage, a voltage divider 134 having a non-linear winding 135 and a slider 136, and a plurality of fixed resistors 137, 140, and 141. Slider 136 is actuated through a mechanical connection 142 by an airspeed responsive device 143.

Ground connections are made to the common terminal 144 between capacitors 132 and 131, to terminals 96, 85, 62, and 40, to resistors 71 and 114, to one end of winding 50 and one side of source 49, and to movable contact 103 of vibrator 101, to complete the necessary circuits in the apparatus.

In one operation embodiment of the invention the following values were found satisfactory:

Winding:
    50 _____ 1.8K.
    54 _____ 1.5K.
    60 _____ 3 K.
    75 _____ 600 ohms.
    126 _____ 5K.
    135 _____ 15K.
Variable resistor 112 _____ 50K.
Resistor:
    64 _____ 200K.
    65 _____ 520K.
    66 _____ 57K.
    71 _____ 30K.
    72 _____ 220K.
    88 _____ 5K. lumped.
    106 _____ 1M.
    110 _____ 13K.
    114 _____ 27K.
    137 _____ 4.5K.
    140 _____ 47K.
    141 _____ 5K.
Capacitor:
    70 _____ 50 mfd.
    89 _____ 250 mfd.
    100 _____ .01 mfd.
    113 _____ 10 mfd.
    130 _____ 1 mfd.
    131, 132 _____ .1 mfd.
Diodes 118 and 121 _____ 6AL5
Source:
    25 _____ 115 v. 400 cycle.
    59 _____ 40 v. D. C. regulated.
    133 _____ 105 v. D. C. regulated.
    61 _____ 40 v. D. C. unregulated.
    (tapped to give ±15 volts on winding 75 and ±10 volts on winding 60)

Operation

In describing the operation of the apparatus it will first be assumed that the craft is in stable flight with a fixed, desired pitch attitude, and that this condition has prevailed for a sufficient interval so that all portions of the apparatus have come into equilibrim. It will also be assumed that source 25 is supplying alternating voltages to the various components where indicated, that sliders 73, 52, 56 and 46 are at the centers of their respective windings, and that the various electronic components of the apparatus have been warmed up to stable operating conditions by conventional means. Under these conditions, the voltages on summation terminals 63, 105 and 107 are all zero, unit 80 is giving no output, and motor 11 is not operating. The position of slider 136 along winding 135 is determined by the indicated airspeed of the craft, of which the maximum value may for illustration be taken as 400 knots.

If for some reason, the craft is caused to change its pitch attitude, as by reason of a gust of wind, slider 52 is displaced with respect to winding 54 in accordance with the amount of the displacement, and slider 56 is displaced with respect to winding 60 in accordance with the rate of the displacement. By the familiar principles of parallel addition of voltages, the voltage at summation terminal 63 is proportional to the sum of the two voltages supplied from sliders 52 and 56. This voltage is converted to an alternating voltage of a proper phase and amplitude in converter 34 and impressed on amplifier 15. Motor 11 is energized to operate, adjusting elevators 12 and slider 46 at an effective speed determined by the voltage on terminal 63. The displacement of slider 46 supplies a further voltage modifying the voltages supplied by sliders 52 and 56, and the change in aircraft attitude resulting from elevator displacement also change the positions of sliders 52 and 56 and the voltages they supply. The apparatus regains a condition of equilibrium when the craft has regained its original pitch attitude and the elevators are once again in their original positions.

If now the human pilot desires to cause a change in the pitch attitude of the craft, he operates control stick 77, displacing slider 73 from the center of winding 75. In apparatus not equipped with unit 80, this applies a voltage from slider 73 through resistor 72 to converter 34 to cause operation of motor 11, thus changing the elevator position and hence the pitch attitude of the craft. This latter change results in displacement of slider 52 relative to winding 54, by vertical gyroscope 43, to give a voltage of the opposite sense. Voltages are also supplied by sliders 46 and 56. If the control stick is held in a displaced position for an appreciable period, the transient voltages from sliders 46 and 56 die out, and the craft assumes a stable pitch attitude displaced from its original pitch attitude by an amount proportional to the extent of operation of stick 77.

As long as the human pilot operates the actual control stick of the craft, with its "feel" of the forces acting on the elevators, he is not likely, and in some cases is not able, to move the stick so fast as to cause dangerous vertical accelerations. However, when stick 77 is merely a handle for adjusting one or more voltage dividers, no back forces on the stick result from its operation, and inexperience or excitement can cause the human pilot to move the stick rapidly to its full travel, impressing a maximum voltage on resistor 72 at a high rate. This would result in rapid operation of motor 11 to adjust elevators 12 to their extreme position, because the automatic pilot must be sensitive and quick-acting if it is to provide stable control of the craft for small deviations from the stabilized course. Vertical accelerations have been known to result, from this type of operation of an aircraft by a human pilot, which were of sufficient magnitude to tear the wings off the craft and to incapacitate the human pilot.

It is not the magnitude of the voltage at resistor 72, but its rate of change, which has the undesirable effect just described. The pitch attitude of the craft is proportional to the displacement of the control stick, but no pitch attitude per se is more dangerous than any other, within the normal limits of automatic pilot operation. The rate of change of the voltage at resistor 72, however, determines the rate at which the craft attempts to assume the new attitude, and hence determines the vertical accelerations to which craft and pilot are subjected at any particular airspeed. To prevent dangerous accelerations it is necessary that a limit be placed on the rate at which the voltage on resistor 72 may vary, without, however, placing any limit on the final value which that voltage may assume.

It is the function of apparatus 80 therefore to so connect slider 73 with resistor 72 that, regardless of the rate of adjustment of stick 77, the voltage on resistor 72 resulting therefrom can never vary at an excessive rate, the permitted maximum being varied in accordance with the airspeed of the craft and depending on the sense of the displacement of stick 77, but the final voltage on resistor 72 being the same as it would have been without apparatus 80. The means whereby this is accomplished have been set out above, and their probable method of operation will now be described.

Biasing voltage for diodes 118 and 121 is provided by source 133. Current from this source flows through resistor 141 and a network including the portion of winding 135 above slider 136 connected in series with the parallel combination of resistor 137 and the portion of winding 135 below slider 136. This current is dependent in magnitude on the setting of slider 136 as it varies the effective resistance in series with resistor 141, and the current causes a voltage drop along resistor 141, making its lower end positive and its upper end negative. This voltage drop is impressed across winding 126 and resistor 140 in series, so that the upper end of the winding is always negative with respect to the lower end, with slider 127 at some intermediate potential determined by its position. Anode 123 is connected to the upper end of winding 126 and is hence always negative with respect to slider 127; similarly cathode 119 is connected to the lower end of winding 126 and hence is always positive with respect to slider 127. Voltage divider 125 accordingly functions to vary the symmetry, about a selected value, of the two diode circuits traced below. The selected value is of course that of slider 127. In a preferred embodiment of the invention slider 127 is set so that anode 123 is .65 volt negative and cathode 117 is 1.64 volts positive with respect to the slider, when the indicated airspeed is 400 knots.

A number of circuits are significant in the operation of the apparatus. The first of these circuits may be traced from tap 62 through a network including the upper portion of source 61 and the portion of winding 75 above slider 73 connected in parallel with the lower portion of source 61 and the portion of winding 75 below slider 73, the slider, conductor 161, resistor 110, terminal 107, and resistor 112 to terminal 84, the circuit being completed through resistance 88 and capacitor 89 in parallel, and ground connections 152 and 153.

The second circuit may be traced from terminal 84 through capacitor 113, terminal 115, and resistor 114, the circuit being completed through ground connections 156 and 152, and comprises a charging and discharging path for the capacitor. Current flows in this circuit only when the output voltage from unit 81 is changing.

The third circuit may be traced from terminal 107 through resistor 106, terminal 105, a network including diode 121 and the portion of winding 126 above slider 127 connected in parallel with diode 118 and the portion of winding 126 below slider 127, the slider, conductor 160, terminal 115, and resistor 114 to ground connection 156. It is obvious that if neither diode is discharging, this circuit is incomplete.

In the normal condition of limiter 80, slider 73 being at the center of winding 75, terminals 107, 105, 84, and 115, are all at ground potential, and capacitor 113 is completely discharged.

If slider 73 is now slowly displaced upwardly, a circulating current flows in the first circuit traced above, causing terminal 107 to become positive with respect to ground. Whenever contact 103 engages contact 104, terminal 105 is grounded and capacitor 100 is discharged: when the two contacts disengage charging current for capacitor 100 flows through resistor 106 and ground connection 151. The charging current for capacitor 100 is so small, for the voltages here present, that terminals 105 and 107 may be considered to be essentially at the same potential at all times. The time constant of the charging and discharging circuits are also small so that the capacitors are fully charged and completely discharged in each cycle of vibrator operation. There thus results a square wave alternating voltage on the input to amplifier 94, the frequency of which is that of source 25, and the phase of which is determined by the polarity of the signal voltage. This alternating voltage is amplified in amplifier 94, and is then converted in unit 81 to a unidirectional output voltage of greater amplitude than that at terminal 105, and of the opposite polarity. The time constant of resistance 88 and capacitor 89 is of the order of 50 milliseconds, so that if the effect of capacitor 113 is neglected, the output voltage can change as fast as it is possible to change the input by moving slider 73. The appearance of the output voltage in the first circuit changes the voltage at terminal 107, reducing that voltage to a value just sufficient to maintain at terminal 84 a voltage equal to the voltage on slider 73, but of the opposite polarity. The internal gain of amplifier 94 is so large, moreover, that only about 20 millivolts at terminal 105 are necessary to produce an output at terminal 84 equal in magnitude to the maximum voltage to be anticipated at slider 73. Terminal 105 is thus never more than 20 millivolts above or below ground, and hence no change in the signal at slider 73 can cause either of the diodes 118 and 121 to discharge, although the output voltage at terminal 84 may take any value which the voltage at slider 73 can take. Under these conditions, limiter 80 acts merely as a conductor connecting slider 73 and resistor 72.

At any time that the voltage at terminal 84 is changing, capacitor 113 is being charged or discharged through resistor 114, and current flows in the resistor producing a voltage drop thereacross. This voltage drop can never, of course, be greater than the output voltage of terminal 84, but for very sudden changes in the output voltage the voltage drop in resistor 114 can approach it in magnitude. This means, in theory, that as long as the voltage at slider 73 remains between .65 volt positive and 1.64 volts negative, for example, terminal 115 is not displaced from ground potential enough to overcome the bias on diodes 118 and 121 respectively, no matter how rapidly the slider is moved. Whenever the voltage at terminal 115 is negative by more than about 1.64 volts, cathode 119 is brought to ground potential in spite of the voltage drop in the lower portion of winding 126. Diode 118 can now discharge, and a relatively low resistance path is completed from terminal 105 to ground even when contacts 103 and 104 are not in engagement. Flow of current in this discharge path results in a voltage drop in resistor 106, thus reducing the voltage of terminal 105, and the input to amplifier 94, for any particular voltage at terminal 107. Resistor 106 is so large that no significant change in the voltage at terminal 107 results.

In this same fashion, whenever the voltage at terminal 115 is positive by more than about .65 volt, anode 123 is brought to ground potential in spite of the voltage drop in the upper portion of winding 126. Diode 121 can now discharge, and a relatively low resistance path is completed from terminal 105 to ground even when contacts 103 and 104 are not in engagement. Flow of current in this discharge path again results in the voltage drop in resistor 106, reducing the voltage at terminal 105, the input to amplifier 94, for any particular voltage at terminal 107.

When the voltage on terminal 105 drops, the output voltage at terminal 84 also drops, changing the current in resistor 114 and hence the bias on slider 127. By this means the voltage at terminal 84 is prevented from increasing at greater than a rate selected by sliders 136 and 127, regardless of the magnitude or rate of change at the voltage on slider 73.

It must now be especially pointed out that the foregoing conclusion relates only to the maximum value of the rate at which the output voltage can change. Whenever the voltage on terminal 115 is within a range set by the voltages between ground and the opposite ends of winding 126, no difference whatever can be found between the voltage on slider 73 and the output voltage on terminal 84. Since that output voltage is supplied through resistor 72 to summation terminal 63, and is used to control the pitch attitude of the craft, this means a small change in pitch attitude can be made by operation of control stick 77 at any desired rate without any difference appearing between the control stick signal itself and the signal supplied at terminal 84 to resistor 72. This is a principal distinction of the present invention over expedients previously known.

Voltage divider 125 is provided in order to make it possible for the voltage at terminal 115 to be greater for changes in one sense of the voltage at terminal 84 than for changes of that voltage in the opposite sense, thus accommodating the apparatus more perfectly to the physiology of the human pilot and to the structural characteristics of the aircraft, both of which permit a greater acceleration of the craft in the direction of raising its nose than in the direction of lowering its nose.

As the airspeed of the aircraft decreases, the pitch rate which can be tolerated without exceeding the acceleration limitations of craft and pilot increases. To accommodate this further characteristic of the overall system, slider 136 is adjusted by airspeed responsive device 143, reducing the effective value of the resistance in series with resistor 141, and therefore increasing the voltage drop appearing across that resistor, as airspeed decreases. In one successful embodiment of the invention, the arrangement was such that at an airspeed of 99 knots the rate of change of pitch attitude was limited to 60° per second in an upper direction and 22° per second in a downward direction, while at an airspeed of 400 knots the change of pitch attitude was limited to 10° per second in an upward direction and 3⅔° per second in a downward direction.

Numerous objects and advantages of my invention have been set forth in the foregoing description, together with the details of the structure and function of the invention, and the novel features thereof are pointed out in the appended claims. The disclosure, however, is illustrative only, and I may make changes in detail, especially in matters of size, shape, and arrangement of parts, within the principle of the invention, to the full extent indicated by the broad general meaning of the terms in which the appended claims are expressed.

I claim as my invention:

1. Apparatus of the class described comprising, in combination: a member to be adjusted within a predetermined range in accordance with a first condition, the rate of adjustment of said member having a maximum safe value; means adjusting said member in accordance with a control voltage; means normally supplying said control voltage in accordance with said first condition; means for reducing said control voltage in accordance with its rate of change; and means preventing operation of said last named means whenever the rate of change of said control voltage has less than a selected value.

2. Apparatus of the class described, comprising, in combination: a member to be adjusted within a predetermined range in accordance with a first condition, the maximum safe rate of adjustment of said member varying in accordance with a second condition; means adjusting said member in accordance with a control voltage; means normally supplying said control voltage in accordance with said first condition; means for reducing said control voltage in accordance with its rate of change; means preventing operation of said last named means whenever the rate of change of said control voltage has less than a selected value; and means selecting said value in accordance with said second condition.

3. Apparatus of the class described comprising, in combination: a control member giving an input which may vary in magnitude and rate of change; means supplying an output which normally varies with said input; control means actuated in accordance with said output; means giving a signal which is less than said output in proportion to the rate of change thereof; means for limiting the effective value of said input in response to said signal; and means preventing operation of said limiting means for values of said signal within a predetermined range.

4. Apparatus of the class described comprising, in combination: a control member giving an input which may vary in magnitude and rate of change; means supplying an output which normally varies with said input; control means actuated in accordance with said output; means giving a signal which is less than said output in proportion to the rate of change thereof; means for limiting the effective value of said input in response to said signal; means for preventing operation of said limiting means for values of said signal within a predetermined range; and means varying the symmetry of said range about a selected value.

5. Apparatus of the class described comprising, in combination: a control member giving an input which may vary in magnitude and rate of change; means supplying an output which normally varies with said input; control means actuated in accordance with said output; means giving a signal which is less than said output in proportion to the rate of change thereof; means for limiting the effective value of said input in response to said signal; means for preventing operation of said limiting means for values of said signal within a predetermined range; and means expanding and contracting said range with decrease and increase in a variable condition.

6. Apparatus of the class described comprising, in combination: a control member giving an input which may vary in magnitude and rate of change; means supplying an output which normally varies with said input; control means actuated in accordance with said output; means giving a signal which is less than said output in proportion to the rate of change thereof; means for limiting the effective value of said input in response to said signal; means preventing operation of said limiting means for values of said signal within a predetermined range, means varying the symmetry of said range about a selected value; and means expanding and contracting said range with decrease and increase in a variable condition.

7. Apparatus of the class described comprising, in combination: an amplifier normally giving an output proportional to the input supplied thereto; control means actuated in accordance with said output; controlling means supplying an input for said amplifier; adjustable means for limiting the effective value of said input to a selected value; means adjusting said limiting means to normally select an effective limiting value which is outside of the normal range of said input; means giving a signal which varies in accordance with the rate of change of said output; and means modifying the output of said adjusting means in accordance with said signal to bring said effective limiting value within the range of said input.

8. Apparatus of the class described comprising, in combination: an amplifier normally giving an output proportional to the input supplied thereto; adjustable means for preventing the effective value of said input from exceeding a selected value; means giving a signal in accordance with the rate of change of said output; and a means adjusting said preventing means in accordance with said signal.

9. Apparatus of the class described comprising, in combination: an automatic pilot for normally actuating a control member of a craft in accordance with a signal; means providing a further signal in accordance with a desired characteristic of movement of the craft; means normally supplying said further signal to said automatic pilot to modify the operation thereof; means reducing the magnitude of said further signal in accordance with its rate of change; and means disabling said last named means whenever said rate of change has less than a selected value.

10. Apparatus of the class described comprising, in combination: an automatic pilot for normally actuating a control member of a craft in accordance with a signal; means providing a further signal in accordance with a desired characteristic of movement of the craft; means normally supplying said further signal to said automatic pilot to modify the operation thereof; means reducing the magnitude of said further signal in accordance with its rate of change; means including a biased diode for disabling said last named means whenever said rate of change has less than a selected value; and airspeed responsive means for varying the bias on said diode to vary such selected value.

11. Apparatus of the class described comprising, in combination: an automatic pilot for normally controlling the elevators of a craft in accordance with the sum of a plurality of signals; means providing a further signal determined by the desired pitch attitude of the craft; means normally supplying said further signal to said automatic pilot to modify the operation thereof; means reducing the magnitude of said further signal in accordance with the rate of change thereof; and means disabling said last named means whenever said further signal has less than a selected value.

12. Apparatus of the class described comprising, in combination: means normally giving an output equal to the input applied thereto; means for limiting the effective value of said input so as to limit said output; means for supplying a first voltage which is less than said output voltage by an amount proportional to the rate of change thereof; means for supplying a second voltage of constant magnitude; and means energizing said limiting means with a voltage representing the difference between said voltages, so that whenever said first voltage is less than said second voltage, operation of said limiting means is prevented.

13. Apparatus of the class described comprising, in combination: means normally giving an output equal to the input applied thereto; diode limiting means for preventing the effective magnitude of said input from exceeding a selected value; first biasing means normally setting the operating level of said limiting means at a value greater than any anticipated magnitude of said input; and second biasing means normally opposing said first baising means in proportion to a quantity which differs from said output by an amount inversely proportional to the rate of change thereof, so that when said quantity exceeds a predetermined value, operation of said limiting means is initiated.

14. Apparatus of the class described comprising, in combination: means normally giving an output whose magnitude is equal to and whose polarity is determined by the input applied thereto; full wave diode limiting means for preventing the effective magnitude of said input from exceeding a selected value for either polarity thereof; first biasing means normally setting the operating level of said limiting means, for inputs of opposite polarity, at values greater than any anticipated magnitudes of said input; and second biasing means normally opposing said first biasing means in proportion to a quantity which differs from said output by an amount inversely proportional to the rate of change thereof, so that when said quantity exceeds a predetermined value, operation of said limiting means is initiated.

15. Apparatus of the class described comprising, in combination: means giving an input voltage which may vary in magnitude and rate of change; a resistance-capacitance network supplying a unidirectional rate voltage which varies with the rate of change of said voltage; electronic means for limiting the magnitude of said input voltage; a biasing voltage normally disabling said limiting means; and means applying said rate voltage in opposition to said biasing voltage to overcome said limiting means whenever said rate voltage exceeds said biasing voltage.

16. Apparatus of the class decribed comprising, in combination: means giving an input voltage which may vary in magnitude and rate of change; a resistance-capacitance network supplying a unidirectional rate voltage which varies with the rate of change of said voltage; means including a diode for limiting the magnitude of said input voltage; means normally biasing said diode to disable its operation as a limiting means; and means applying said rate voltage in opposition to said biasing means to restore operation of said limiting means whenever said rate voltage exceeds said biasing voltage.

17. Apparatus of the class described comprising, in combination: means giving an input voltage which may vary in magnitude and rate of change; a resistance-capacitance network supplying a unidirectional rate voltage which varies with the rate of change of said voltage; means including a pair of oppositely connected diodes for limiting the magnitude of said input voltage; means normally biasing said diodes to disable their operation as limiting means; and means applying said rate voltage in opposition to said biasing means to restore operation of said limiting means whenever said rate voltage exceeds said biasing voltage.

18. Apparatus of the class described comprising, in combination: an amplifier having a high level output and a low level input; a full wave electronic diode limiter connected to limit the voltage applied to the input of said amplifier; biasing means for interrupting operation of said limiter when the signal level drops below a value which is much larger than the variations in the limiter due to variations with heater voltage of Edison effect currents in the limiter diodes; and rate feedback means for overcoming the effect of said biasing means, so that the output from said amplifier is relatively unaffected by said variations in Edison effect currents.

19. Apparatus of the class described comprising, in combination: an amplifier having a high level output and a low level input; a pair of full wave connected limiter diodes providing a path for circulating Edison effect currents when said diodes are not equally biased; means connecting said diodes to limit the voltage applied to the input of said amplifier; means differently biasing said diodes to interrupt operation of said limiter when the signal level drops below values which are unequal for signals of different sense, and which are of greater orders of magnitude than variations in self-biasing voltage drops in said path due to Edison effect currents in said diodes; and rate feedback means for overcoming the effect of said biasing means, so that the effect of said variations in said Edison effect currents on the output of said amplifier is minimized.

20. Apparatus of the class described comprising, in combination: a controlling member giving a signal which may vary in magnitude and rate of change; a device normally giving an output proportional to the input supplied thereto; means connected to said member and said device for combining said output and said signal to comprise an input for said device; adjustably biased limiting means connected to said device for preventing the effective value of said input from exceeding a magnitude determined by the value of the bias thereon; means giving a further signal in accordance with the rate of change of said output; means modifying said bias in accordance with said further signal; and controlled means to said device for actuation in accordance with said output, so that the extent of operation of said controlled means is determined by that of said controlling means, and so that beyond a limit set by the adjustment of said bias the rate of operation of said controlled means is independent of the rate of operation of said controlling means.

21. Apparatus of the class described comprising, in combination: a controlling member giving a signal which may vary in magnitude and rate of change; a device normally giving an output proportional to the input supplied thereto; means connected to said member and said device for combining said output and said signal to comprise an input for said device; adjustably biased full-wave limiting means connected to said device for preventing the effective values of said input having opposite senses from exceeding magnitudes determined by the values of the bias thereon; means differentially adjusting said values of bias so that said magnitudes are different for equal inputs of opposite senses; means giving a further signal in accordance with the rate of change of said output; means modifying said bias in accordance with said further signal; and controlled means connected to said device for actuation in accordance with said output, so that the extent of operation of said controlled means is determined by that of said controlling means, and so that beyond a limit set by the adjustment of said bias the rate of operation of said controlled means is independent of the rate of operation of said controlling means.

References Cited in the file of this patent

UNITED STATES PATENTS

| | | |
|---|---|---|
| 2,299,390 | Holmes et al. | Oct. 20, 1942 |
| 2,424,349 | Cawein | July 22, 1947 |
| 2,457,794 | Clarke | Dec. 28, 1948 |
| 2,485,005 | Lindesmith | Oct. 18, 1949 |
| 2,521,904 | Doak | Sept. 12, 1950 |
| 2,582,305 | Young | Jan. 15, 1952 |
| 2,589,834 | MacCallum | Mar. 18, 1952 |